United States Patent Office 2,822,242
Patented Feb. 4, 1958

2,822,242

MANUFACTURE OF CALCIUM SULPHATE ANHYDRITE FROM GYPSUM, CALCIUM CARBONATE AND SULFURIC ACID

Donald P. Doll, Webster Groves, Warren Rodgers, St. Louis, and Charles R. Trampier, Jr., Crestwood, Mo., assignors to National Lead Company, New York, N. Y., a corporation of New Jersey No Drawing. Application February 10, 1954
Serial No. 409,506

5 Claims. (Cl. 23—122)

The present invention relates to a method for the preparation of anhydrite calcium sulfate possessing excellent pigment properties and especially adapted for the manufacture of composite titanium dioxide-calcium sulfate pigments.

The present application is a continuation-in-part of co-pending application, Serial Number 260,328, filed December 6, 1951, now abandoned.

Prior to the present invention, calcium sulfate anhydrite has been artificially prepared in several ways. According to one method, as described by Washburn et al, in U. S. patents No. 1,906,730 and No. 2,222,385, the anhydrite is formed directly by adding an alkaline-reacting compound of calcium, e. g. hydrated lime, to strong sulfuric acid under such conditions of concentration, temperature, etc. as to maintain dehydrating conditions throughout the reaction whereby anhydrite is formed directly without passing through an hydrated phase. According to another method as described by Sullivan in U. S. patent No. 2,151,339, sulfuric acid is neutralized with an alkaline calcium compound to obtain a product which contains substantial amounts of gypsum, $CaSO_4 \cdot 2H_2O$. This material is converted to anhydrite by coking or digesting in an aqueous sulfuric acid solution. According to a third method as described by Sullivan in U. S. Patent No. 2,197,953, strong sulfuric acid is partially neutralized with an alkaline calcium compound forming particles of anhydrite suspended in a sulfuric acid medium. Sullivan refers to this as a "seed suspension" and to it is added finely-divided gypsum and the mixture is then heated to convert the gypsum to anhydrite.

All of the foregoing methods have certain economic disadvantages: The method of Washburn et al., because of the necessity of maintaining dehydrating conditions, produces a waste mother liquor containing relatively large amounts of valuable acid. Sullivan's first method requires a rather prolonged, expensive heating treatment to effect conversion of gypsum to anhydrite. His second method requires careful control of the conditions for forming the "seed suspension" and for the conversion of the added gypsum to anhydrite. By means of the present invention, these disadvantages are overcome by means of a simple, inexpensive process which produces high quality anhydrite. According to an economically important embodiment of the invention, waste sulfuric acid liquors are employed as a source of sulfate values from which the anhydrite is produced.

The principal object of the invention is, therefore, the economical production of high quality calcium sulfate anhydrite. Another object of the invention is the preparation of calcium sulfate anhydrite useful in the preparation of composite titanium dioxide-calcium sulfate pigments. A third important object is a process for the utilization of waste sulfuric acid liquors in the preparation of high quality calcium sulfate anhydrite. These and other objects of the present invention will become apparent from the ensuing description.

In its broadest aspect the present invention contemplates mixing together finely-divided calcium carbonate and finely-divided gypsum with water to form a slurry, adding the resultant mixture to strong sulfuric acid in slight excess over that required to react with the calcium carbonate maintained at an elevated temperature and, when the addition is complete, separating the calcium sulfate anhydrite from the mother liquor.

The preferred form of calcium carbonate for the practice of the present invention is finely-divided limestone which is ground to less than 325 mesh (44 microns, U. S. standard). The gypsum may be any available form of this material, e. g. natural gypsum ground to about the same particle size as the limestone. However, a preferred form of gypsum is that obtained according to the teaching of co-pending application, Serial Number 260,328. According to that teaching, finely-divided limestone ground to below 325 mesh is reacted with a sulfuric acid liquor having a concentration of $H_2SO_4$ below about 40 percent and preferably within the range of 4 percent to 25 percent. A type of sulfuric acid liquor especially suited for the preparation of the gypsum is hydrolysis mother liquor obtained after the hydrolytic precipitation of the titanium values from titanium sulfate solutions in the manufacture of titanium dioxide pigments. Such hydrolysis liquors generally contain from about 10 percent to about 25 percent $H_2SO_4$. The quantity of sulfuric acid employed is somewhat in excess of the stoichiometric quantity required to react with the calcium carbonate, neutralization of the acid being carried out to from about 75 percent to about 95 percent of completion. It is important when utilizing waste sulfuric acid liquors to maintain some acid in the final mother liquor in order to prevent precipitation of impurities such as iron, vanadium, chromium and manganese. When pure dilute sulfuric acid is used with relatively pure limestone, the reaction, that is to say, the neutralization of the sulfuric acid, may go substantially to completion.

According to the teachings of the said Serial Number 260,328, the ground limestone in the form of an aqueous slurry and the sulfuric acid liquor are flowed separately and simultaneously into a suitable reaction vessel under normal conditions of temperature and pressure. Agitation should be employed during the mixing, but the use of mechanical agitators may be avoided by delivering the limestone slurry onto a splash plate situated at the top of the reaction vessel and the waste acid in a stream that is tangential to the circumference of the vessel. The reaction is practically instantaneous and substantially complete upon conclusion of the mixing. However, it is desirable to hold the mixture in the reaction vessel for a short time after the finish of the mixing to permit the expulsion of carbon dioxide and to insure that no precipitation of gypsum will occur in lines leading out of the reaction vessel. After the completion of the reaction, the gypsum is dewatered and washed. The latter step, i. e. the washing, may not be necessary where the waste acid is very low in impurities, but in general, it is desirable to wash the dewatered gypsum.

The gypsum so obtained is ready for mixing with limestone for the preparation of anhydrite according to the present invention.

The relative proportions of limestone to gypsum are not critical, but may vary widely. For the manufacture of anhydrite to be subsequently employed in titanium pigment manufacture, equal parts of limestone and gypsum (on the basis of Ca) have been found to yield a satisfactory mixture. At the present time, sulfuric acid is a material in short supply because of the shortage of sulfur. It will, therefore, be understood that, if the manufacture of titanium dioxide-calcium sulfate composite pigment with minimum consumption of fresh sulfuric acid is the ultimate objective, the amount of limestone should be kept as low as possible. The addition of the limestone has certain advantages: (1) due to the exothermic reaction between it and the sulfuric acid, heat is supplied to the reaction mixture; (2) the reaction between the sulfuric acid and the limestone in the slurry favorably influences the formation of small, fine particles of pigmentary useful anhydrite; (3) it furnishes make-up anhydrite for composite titanium pigment manufacture, since the waste acid does not contain sufficient sulfate content to produce sufficient anhydrite to meet plant requirements; (4) it avoids excess dilution resulting from dehydration of the gypsum; and (5) it forms a substantially neutral slurry permitting the use of iron and steel equipment.

The mixing of the gypsum and limestone, preferably as slurries, is accomplished before treatment with strong sulfuric acid. The acid should be at least 55 percent $H_2SO_4$.

Seventy-eight percent sulfuric acid (60 Bé.) has been very satisfactory for the practice of the invention. The proportion of sulfuric acid to the calcium (Ca) content of the limestone-gypsum mixture should be in sufficient excess over that required to react with the limestone present in the mixture to provide at least 4 percent sulfuric acid in the final liquor, taking into account the water content of the limestone-gypsum mixture, the water in the strike acid, the water formed by reaction between the limestone and sulfuric acid, and the water of crystallization of the gypsum released during conversion to anhydrite. Here also, the excess remaining in the final liquor should be as low as possible for reasons of economy. A good, practical operating proportion is one that permits between about 6.0 and 7.5 percent $H_2SO_4$ to remain in the final liquor.

The treatment of the limestone-gypsum mixture with the sulfuric acid is preferably effected by running a slurry of the mixture into the strong sulfuric acid slowly during a period of time which will vary depending upon the amount of mixture to be added and the rate at which heat can be supplied to the strike. The time may vary with large batches between about 60 and 100 minutes.

At the start of the addition of the limestone-gypsum slurry to the acid, the slurry may be at room temperature, i. e. at about 25° C. to 35° C.; it should not be substantially higher than this point because it has been found that higher temperatures tend to promote the formation of anhydrite of large particle size, larger, in fact, than is desirable for anhydrite to be employed in the manufacture of composite titanium pigments. It has been found, further, that particle size of the initially formed anhydrite, the first 15 percent or less, influences the particle size of the subsequently formed anhydrite. It is important to insure that the particle size of the initially formed anhydrite, because of its large particle size, does not render the batch of anhydrite unsuitable for pigment use. This is best accomplished by maintaining the temperature of the sulfuric acid at the start of the treatment at about 60° C. As the limestone-gypsum slurry is added to the sulfuric acid, the temperature begins to rise because of the exothermic nature of the reaction between the limestone and acid. It then tends to fall, and heat is supplied to the batch and continued until completion of the addition. Table I shows the temperature gradients for several different treatments in which the limestone-to-gypsum ratio differed widely.

TABLE I

| Percent $CaSO_4$ from Gypsum | None | 50 | 80 | 90 | 95 | 100 |
|---|---|---|---|---|---|---|
| Percent $CaSO_4$ from $CaCO_3$ | 100 | 50 | 20 | 10 | 5 | None |
| (60 Bé.$H_2SO_4$ at 60 C. at start) | | | | | | |
| Time, Minutes: | | | | | | |
| 0 | 60 | 60 | 61 | 60 | 60 | 60 |
| 1 | 70 | 66 | 65 | 67 | 69 | 65.5 |
| 2 | 80 | 69 | 69 | 67 | 69 | 64.5 |
| 3 | 85 | 71 | 70 | 66 | 66 | 62 |
| 4 | Heat Applied | 73 | 72 | 63 | 64 | 59 |
| 5 | | 74 | 73 | 62 | 60 | 56 |
| 6 | | 75 | Heat Applied | 60 | 58 | 53.5 |
| 7 | | 76 | | 57 | 55 | 51.5 |
| 8 | | 77 | | 55 | 53.5 | 50 |
| 9 | | | | 53 | 52 | 49 |
| 10 | | 77 | | 51.5 | 50.5 | 47.5 |
| 11 | | | | 49 | 49 | 46.5 |
| 12 | | | | 48 | 48 | Heat Applied |
| 13 | | 76 | | 47 | 47 | |
| 14 | | | | 46 | 46 | |
| 15 | | | | 45 | 45 | |
| 16 | | 73 | | 45 | 43 | |
| 17 | | Heat Applied | | Heat Applied | Heat Applied | |
| Maximum temperature with applied heat | 126 | 122 | 123 | 104 | 102 | 101 |
| Final temperature | 101 | 102 | 103 | 101 | 100.5 | 101 |
| Addition time, min | 60 | 96 | 100 | 68 | 68 | 70 |

For further, more complete understanding of the present invention, the following examples are supplied solely for illustrative purposes:

Example I

A concentrated slurry of ground limestone having an average particle size and a particle-size distribution as of that discussed above was prepared. It contained about 40.8 tons of limestone (hereinafter the formula $CaCO_3$ will be employed for limestone; $H_2O$ for water; $H_2SO_4$ for sulfuric acid, $CaSO_4 \cdot 2H_2O$ for gypsum and $CaSO_4$ for anhydrite) and about 61.2 tons of $H_2O$, a total of 102.0 tons. Ninety-two tons of this slurry was fed into a reaction vessel at the top by flowing it on a splash plate while simultaneously adding hydrolysis mother liquor to the vessel at the side tangentially to the circumference. The total amount of acid added was about 865.0 tons, containing about 48.0 tons of 100 percent $H_2SO_4$ which indicates that the liquor had an $H_2SO_4$ content of about 5.5 percent $H_2SO_4$. During the addition, about 16.2 tons of carbon dioxide gas was evolved. The neutralization was about 75 percent complete.

940.8 tons of product was obtained. Of this amount, about 63.3 tons was $CaSO_4 \cdot 2H_2O$ (containing about 50.0 tons $CaSO_4$), about 12.0 tons was $H_2SO_4$, and about 865.5 tons was liquor containing the impurities present in the hydrolysis waste acid. The 940.8 tons of product was filtered and washed on rotary filters. The filtrate was discarded. The filter cake consisted of a thick, plastic mass of $CaSO_4 \cdot 2H_2O$.

157.5 tons of the filter cake was repulped with an agitator and the slurry was pumped to a larger mixing vessel. There was then added 10 tons of the $CaCO_3$ slurry containing about 4.0 tons $CaCO_3$ and 6.0 tons $H_2O$ which had been originally prepared. This mixture, consisting of about 62.6 tons of $CaSO_4 \cdot 2H_2O$ (containing about 49.5 tons $CaSO_4$), 4.0 tons of $CaCO_3$ and 101 tons of $H_2O$, at 25° C. was allowed to flow slowly during a period of about 100 minutes into 14.4 tons of 77.8 percent $H_2SO_4$ at 60° C. while agitating the mixture. Within the first two minutes of the addition, the temperature rose slowly to about 67° C. and then began to decline. After about 15 minutes, heat was applied. At the end of the treatment, the final liquor contained about 55.0 tons $CaSO_4$, 7.3 tons $H_2SO_4$ and 118.0 tons $H_2O$. The recovered $CaSO_4$ (anhydrite) was found to be excellently suited for the manufacture of titanium dioxide, calcium sulfate composite pigments by the known, so-called co-precipitation method.

*Example II*

To 50 tons of finely-divided natural gypsum-water slurry containing 50 percent solids, calculated as $CaSO_4 \cdot 2H_2O$, was added 12 tons of finely-ground limestone-water slurry containing 40 percent limestone $CaCO_3$, and 9.5 tons of water yielding a mixed slurry in which 75 percent of the total calcium, Ca, was replaced by natural gypsum. After thoroughly mixing this slurry, it was pumped into a reaction vessel containing 9.8 tons of 77.8 percent sulfuric acid at a temperature of 50° C., agitating mechanically during the addition. The temperature rose rapidly during the initial period of addition and thereafter receded. As the decreasing temperature approached 40° C., heat was applied through steam coils in the reaction vessel. After the completion of the addition of the mixed gypsum-limestone slurry, the resultant calcium sulfate product was recovered by filtration. It was found to be calcium sulfate anhydrite, $CaSO_4$, easily adapted for the manufacture of composite titanium dioxide calcium sulfate pigments.

It will be seen from the foregoing description of the present invention and the examples thereof that it differs from the prior art in that the formation of anhydrite proceeds through the neutralization of the calcium compound simultaneously with the conversion of gypsum to anhydrite. Heretofore anhydrite was formed either by direct neutralization of sulfuric acid with the calcium compound, according to Washburn, or by means of a conversion of gypsum involving "seeding" or digestion according to the methods of Sullivan. The acid employed in the present invention consists initially of substantially pure sulfuric acid solution in which there are no seeds present and the invention does not include any period of digestion after completion of the addition of the mixed gypsum limestone slurry to the sulfuric acid.

While this invention has been described and illustrated by the examples shown, it is not intended to be strictly limited thereto, and other modifications and variations may be employed within the scope of the following claims.

What is claimed is:

1. Method for the preparation of pigmentary calcium sulfate anhydrite which comprises mixing together finely-divided calcium carbonate and finely-divided gypsum with water to form a slurry, adding the resultant mixed gypsum-calcium carbonate slurry continuously to a solution consisting initially of at least 55 percent $H_2SO_4$ at a temperature not higher than about 60° C., the amount of said solution being such as to provide at least 4 percent sulfuric acid in the mother liquor after the reaction between the calcium carbonate and sulfuric acid is complete and maintaining the reaction mixture under agitation and at an elevated temperature during the said addition.

2. Method according to claim 1 wherein the finely-divided calcium-carbonate is ground limestone.

3. Method according to claim 1 wherein the finely-divided gypsum is ground natural gypsum.

4. Method according to claim 1 wherein the finely-divided gypsum is obtained by reaction between an alkaline-reacting calcium compound and dilute sulfuric acid.

5. Method for the preparation of calcium sulfate anhydrite which comprises admixing finely-divided ground limestone with a sulfuric acid liquor containing from about 4 percent to about 25 percent $H_2SO_4$, the quantity of sulfuric acid employed being in excess of the stoichiometric quantity required to react with the limestone, separating the resultant gypsum from the supernatant liquor and mixing said gypsum with ground finely-divided limestone and water to form a slurry, adding the mixed gypsum-limestone slurry continuously to a solution consisting initially of at least 55 percent $H_2SO_4$ at a temperature of about 60° C., the amount of acid being such as to provide at least 4 percent sulfuric acid in the mother liquor after the reaction with the sulfuric acid is complete, maintaining the reaction mixture under agitation and at an elevated temperature during said addition and when said addition is complete, separating the calcium sulfate so formed from the mother liquor.

References Cited in the file of this patent

UNITED STATES PATENTS

| | | |
|---|---|---|
| 2,006,342 | Booge | July 2, 1935 |
| 2,021,910 | Crundall | Nov. 26, 1935 |
| 2,197,953 | Sullivan | Apr. 23, 1940 |
| 2,213,907 | Fleckenstein | Sept. 3, 1940 |
| 2,222,385 | Washburn | Nov. 19, 1940 |
| 2,313,844 | Sullivan | Mar. 16, 1943 |